United States Patent [19]

Begley et al.

[11] Patent Number: 4,485,530
[45] Date of Patent: Dec. 4, 1984

[54] CONDUIT CASE (CASE 2)

[75] Inventors: Maxwell G. Begley, Dianella; Keith Munslow-Davies, Morley, both of Australia

[73] Assignee: Kelvin E. Lord & Co., West Perth, Australia

[21] Appl. No.: 442,164

[22] Filed: Nov. 16, 1982

[30] Foreign Application Priority Data

Jun. 23, 1982 [AU] Australia ............... PF4558

[51] Int. Cl.$^3$ ................. B65D 63/02; F16L 3/08
[52] U.S. Cl. ...................... 24/270; 24/24;
24/279; 24/498; 24/516; 285/409
[58] Field of Search ............ 24/270, 271, 274 P,
24/279, 285, 286, 24, 457, 503, 504, 498, 494,
506, 509, 510, 515, 516, 500, 517; 248/74 R;
285/409

[56] References Cited

U.S. PATENT DOCUMENTS

| 1,110,011 | 9/1914 | Schneider | 24/516 |
|---|---|---|---|
| 1,191,000 | 7/1916 | Harrison | 24/24 |
| 1,303,249 | 5/1919 | Brown | 248/74 R |
| 1,693,064 | 11/1928 | Tipton | 24/270 |
| 2,388,674 | 11/1945 | Browne | 24/279 |
| 2,453,492 | 11/1948 | Carter | 24/270 |
| 2,775,806 | 1/1957 | Love | 24/271 |
| 3,280,846 | 10/1966 | Anderson et al. | 24/285 |
| 3,503,244 | 3/1970 | Joslin | 24/498 |
| 3,637,011 | 1/1972 | Wheeler | 24/498 |
| 4,059,872 | 11/1977 | Delesandri | 24/279 |

FOREIGN PATENT DOCUMENTS 1266578 6/1961 France ................. 24/285

Primary Examiner—Victor N. Sakran
Attorney, Agent, or Firm—Kerkam, Stowell, Kondracki & Clarke

[57] ABSTRACT

The present invention provides a conduit clamp comprising a pair of jaws, said jaws comprising respective, opposed recesses arranged to abut against sides of a conduit, said jaws comprising means for pivotally connecting them together at one end, one of said jaws comprising an aperture, and the other of said jaws comprising a twist lock means, such that, to close the jaws and clamp a conduit, the twist lock means is inserted in the aperture and partially rotated, means also being provided for securely attaching the clamp to a stable structure.

The clamp of the present invention is particularly useful for clamping relatively small diameter conduits such as electrical conduits and hose lines to a permanent structure. It is particularly envisaged for use underwater but can be used for mining and industrial applications which are not underwater.

3 Claims, 3 Drawing Figures

CONDUIT CASE (CASE 2)

The present invention relates to conduit clamps.

When drilling for oil underwater particularly under sea, it is often necessary to clamp conduits such as electrical conduits or hose lines to prevent them from becoming damaged. The conduits are clamped in such a manner as to attach them securely to a permanent structure such as a kill and choke line.

The present invention provides a clamp which is particularly useful for clamping relatively small diameter conduits such as electrical conduits or hose lines to a permanent structure. The clamp of the present invention is particularly envisaged for use underwater especially for sub-sea operation, but it can be used for mining and industrial applications which are not underwater.

In accordance with the present invention there is provided a conduit clamp comprising a pair of jaws, said jaws comprising respective, opposed recesses arranged to abut against sides of a conduit, said jaws comprising means for pivotally connecting them together at one end, one of said jaws comprising an aperture, and the other of said jaws comprising a twist lock means, such that, to close the jaws and clamp a conduit, the twist lock means is inserted in the aperture and partially rotated, means also being provided for securely attaching the clamp to a stable structure.

The present invention will now be described, by way of example, with reference to the accompanying drawings, in which.

Figure 1:
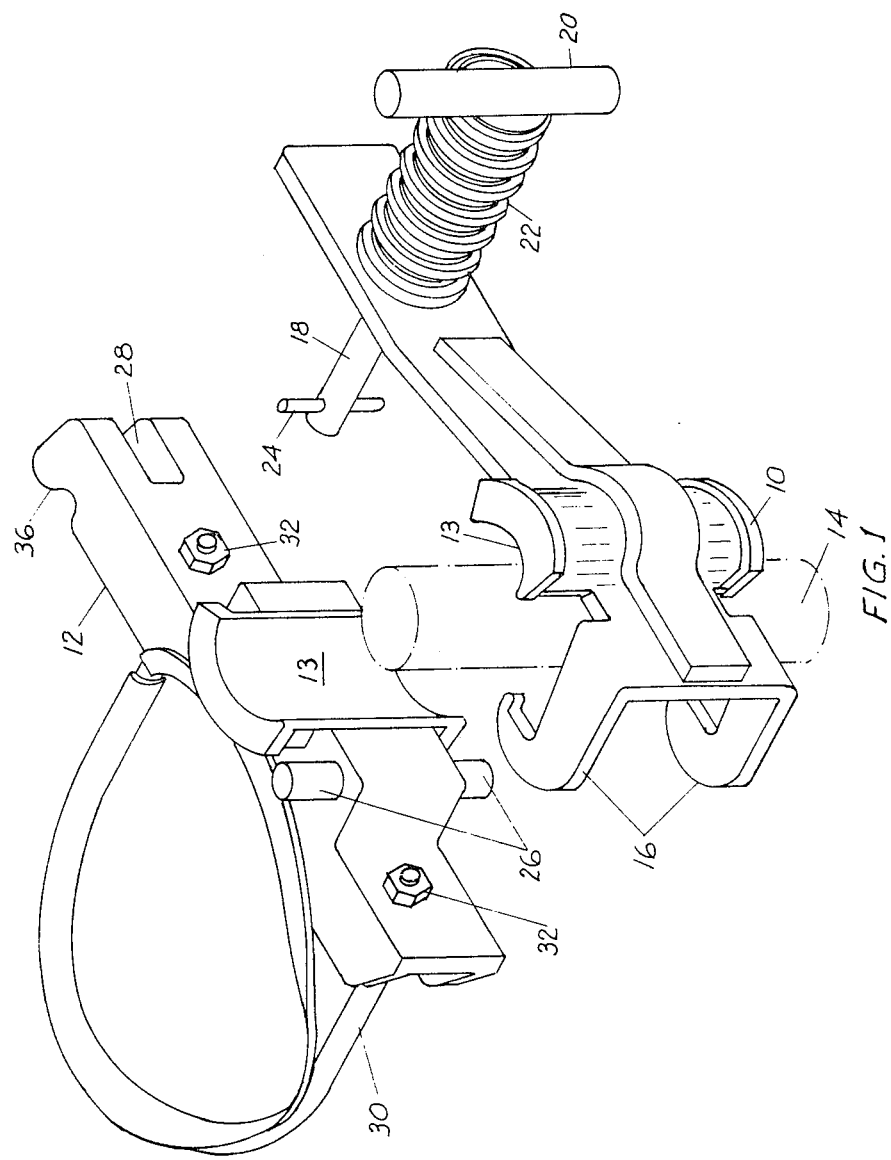
FIG. 1 is an upper, perspective view of a clamp in accordance with the present invention.

In the drawing, there is shown a clamp in accordance with the present invention, which clamp comprises a pair of jaws 10 and 12. Each jaw 10 and 12 comprises a respective, opposed part cylindrical recess 13 arranged to abut against a side of a conduit 14 when the clamp is closed. The conduit 14 typically has a diameter of about 1½" but it could have a diameter over a wide range of values such as up to 2½" or more.

The jaw 10 comprises at one end a pair of hooks 16 which are rigidly attached to the jaw 10. At the opposite end the jaw 10 is provided with a twist lock assembly comprising a pin 18 which extends through an apertrue in the body of the jaw 10. The pin 18 has a handle 20 at one end and a spring 22 is mounted about the pin 18 adjacent the handle 20. The spring 22 urges the pin 18 outwardly a predetermined extent. At its end remote from the handle 20, the pin 18 is provided with a locking lug 24.

The jaw 12 comprises a pair of pins 26 opposite the hooks 16 of the jaw 10. The hooks 16 are arranged to pivotally engage the pins 26 in use. At its end remote from the pins 26, the jaw 12 is provided with an open ended recess 28 arranged to receive the pin 18 through the open end thereof.

Further, on its side remote from the jaw 10, the jaw 12 is provided with a U-bolt 30 having threaded ends extending through apertures in the body of the jaw 12. The threaded ends are retained in place by means of nuts 32.

In use, the U-bolt 30 is mounted about a kill and choke line (not shown) or the like and the jaw 12 is affixed to it by pushing the threaded ends of the U-bolt through the appropriate apertures in the jaw 12 and securing the ends by means of the nuts 32.

Then the hooks 16 are pivotally mounted about the pins 26 and the jaw 10 pivoted towards the jaw 12 with the conduit 14 sandwiched by the recesses 13.

The pin 18 is partially rotated so that the locking lug 24 is aligned with the aperture 28 and can pass therethrough.

Figure 2:
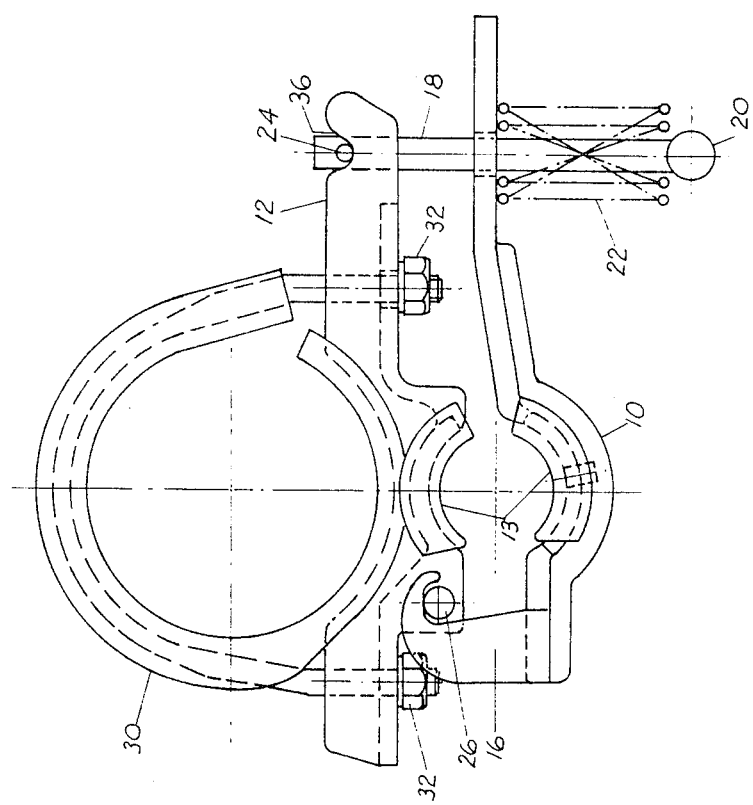
FIG. 2 is a plan view of the clamp of FIG. 1.
Figure 3:
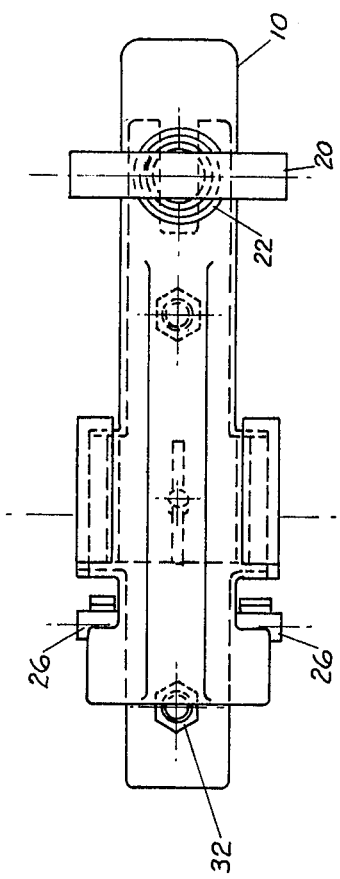
FIG. 3 is a side elevation of the clamp of FIG. 1.

Thus, the locking lug 24 is then passed through the aperture 28. Once the locking lug 24 is past the aperture 28 the pin 18 is rotated partially by means of the handle 20 so that the locking lug 24 can engage a recess 36 behind the jaw 12 as shown in FIG. 2. The locking lug is further urged into positive engagement with the recess 36 by the action of the spring 22 pushing against the handle 20.

To undo the clamp, the pin 18 is slightly depressed by the handle 20 and then the handle 20 partially rotated to enable the pin 18 to be withdrawn from the aperture 20.

Modifications and variations such as would be apparent to a skilled addressee are deemed within the scope of the present invention. For example, the hooks 16 and pins 26 could be replaced by an equivalent permanent, pivotal coupling by which the jaws 10 and 12 could be permanently joined together but could be opened and closed as desired.

We claim:

1. A conduit clamp comprising a pair of jaws and means for securely attaching the clamp to a stable structure, said jaws comprising respective, opposed recesses arranged to abut against sides of a conduit, said jaws comprising means for pivotally connecting them together at a first end, one of said jaws comprising at a second end an aperture and a recess behind the aperture, and the other of said jaws comprising a twist lock means at a second end comprising a pin rotatably mounted in an aperture in said other jaw, provided adjacent one end with a locking lug at one end of the pin, a handle at another end of the pin remote from the locking lug, such that the pin can be inserted endwise in the aperture with the locking lug foremost and the pin can then be axially rotated by means of the handle so as to cause the locking lug to engage behind the said one jaw and be received by the recess to lock the jaws together, a coil spring being mounted about the pin between the handle and the adjacent jaw so as to urge the handle away from the jaws and the locking lug into engagement with the recess in the locking position of the twist lock, such that, to close the jaws and clamp a conduit, the twist lock means is inserted in the aperture and partially, axially rotated.

2. A conduit clamp according to claim 1, wherein one of said jaws is provided with hook means adjacent one end and the other of said jaws is provided with complementary pin means at one end such that the hook means can be pivotally mounted about the pin means.

3. A conduit clamp according to claim 1, in which the means for securely attaching the clamp to a stable structure comprises a U-bolt having free ends threadedly engaged with one of said jaws.

* * * * *

UNITED STATES PATENT AND TRADEMARK OFFICE
CERTIFICATE OF CORRECTION

PATENT NO. : 4,485,530

DATED : December 4, 1984

INVENTOR(S) : Maxwell Graham Begley et al.

It is certified that error appears in the above-identified patent and that said Letters Patent is hereby corrected as shown below:

Title of invention should read -- CONDUIT CLAMP (CASE 2 ) --.

On the title page, delete "/73/ Assignee: Kelvin E. Lord & Co., West Perth, Australia".

Signed and Sealed this

Twenty-third Day of April 1985

[SEAL]

Attest:

DONALD J. QUIGG

Attesting Officer

Acting Commissioner of Patents and Trademarks